(12) United States Patent
Ishido

(10) Patent No.: US 7,474,437 B2
(45) Date of Patent: Jan. 6, 2009

(54) IMAGE PROCESSING METHOD AND APPARATUS

(75) Inventor: Katsuhiro Ishido, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 10/442,793

(22) Filed: May 20, 2003

(65) Prior Publication Data

US 2003/0219170 A1 Nov. 27, 2003

(30) Foreign Application Priority Data

May 24, 2002 (JP) ............................. 2002-150496

(51) Int. Cl.
*G06F 15/00* (2006.01)
*H04N 1/46* (2006.01)
(52) U.S. Cl. ..................... 358/1.9; 358/525; 358/514
(58) Field of Classification Search ................. 358/1.9, 358/525, 504, 514, 474, 461, 463, 497, 518; 382/275, 300; 386/50, 73
See application file for complete search history.

(56) References Cited

U.S. PATENT DOCUMENTS

| | | | |
|---|---|---|---|
| 4,691,365 A | 9/1987 | Nagashima | 382/274 |
| 4,776,031 A * | 10/1988 | Mita | 382/323 |
| 4,920,428 A * | 4/1990 | Lin et al. | 358/461 |
| 4,982,294 A * | 1/1991 | Morton et al. | 358/465 |
| 5,189,529 A * | 2/1993 | Ishiwata et al. | 358/451 |
| 5,272,536 A * | 12/1993 | Sudo et al. | 348/243 |
| 5,327,247 A * | 7/1994 | Osborne et al. | 348/100 |
| 5,604,825 A * | 2/1997 | Hirota et al. | 382/261 |
| 5,701,505 A * | 12/1997 | Yamashita et al. | 712/11 |
| 5,886,353 A * | 3/1999 | Spivey et al. | 250/370.09 |
| 5,999,211 A * | 12/1999 | Hedges et al. | 348/144 |
| 6,087,673 A * | 7/2000 | Shishido et al. | 250/559.45 |
| 6,359,706 B1 * | 3/2002 | Arita et al. | 358/486 |
| 6,366,366 B1 * | 4/2002 | Nakamura | 358/487 |
| 6,567,192 B1 * | 5/2003 | Toyomura et al. | 358/497 |
| 6,580,837 B1 * | 6/2003 | Johnson | 382/300 |
| 6,642,960 B1 * | 11/2003 | Kohashi et al. | 348/246 |
| 6,747,766 B1 * | 6/2004 | Kamisuwa et al. | 358/505 |
| 6,792,161 B1 * | 9/2004 | Imaizumi et al. | 382/275 |

(Continued)

FOREIGN PATENT DOCUMENTS

EP 0975 143 A2 1/2000

(Continued)

OTHER PUBLICATIONS

Japanese Office Action dated Dec. 22, 2006 for the Japanese counterpart application No. 2002-150496 without English translation.

*Primary Examiner*—Madeleine A Nguyen
(74) *Attorney, Agent, or Firm*—Morgan & Finnegan, LLP

(57) ABSTRACT

An image processing apparatus for processing image data, obtained from an image sensing unit in which plural sensor chips each having plural pixels are arrayed with an interval of a multiple of a pixel width therebetween, and interpolating image data for the interval. If an abnormal pixel exists, image data of the abnormal pixel is replaced with data in accordance with image data of a pixel adjacent to the abnormal pixel, and thereafter, interpolation is performed for the interval by using image data from a sensor chip adjacent to said interval.

16 Claims, 17 Drawing Sheets

U.S. PATENT DOCUMENTS

| | | | |
|---|---|---|---|
| 7,088,388 B2 * | 8/2006 | MacLean et al. | 348/234 |
| 7,145,597 B1 * | 12/2006 | Kinjo | 348/222.1 |
| 7,190,396 B2 * | 3/2007 | Sasaki | 348/254 |
| 7,259,780 B2 * | 8/2007 | Noguchi | 348/207.11 |
| 2001/0036305 A1 * | 11/2001 | Jun | 382/149 |
| 2002/0071135 A1 * | 6/2002 | Takeda et al. | 358/1.14 |
| 2002/0110376 A1 * | 8/2002 | MacLean et al. | 396/429 |
| 2003/0090742 A1 * | 5/2003 | Fukuda et al. | 358/448 |
| 2004/0063047 A1 * | 4/2004 | Noguchi et al. | 430/503 |
| 2004/0156033 A1 * | 8/2004 | Kanemitsu | 356/3.01 |
| 2004/0169747 A1 * | 9/2004 | Ono et al. | 348/272 |
| 2004/0174320 A1 * | 9/2004 | Matthijs et al. | 345/30 |
| 2004/0263920 A1 * | 12/2004 | Kondo et al. | 358/497 |
| 2005/0099516 A1 * | 5/2005 | Kagle et al. | 348/246 |
| 2006/0256214 A1 * | 11/2006 | MacLean et al. | 348/234 |

FOREIGN PATENT DOCUMENTS

| | | |
|---|---|---|
| EP | 1 085 746 A1 | 3/2001 |
| JP | 61-224660 | 10/1986 |
| JP | 61-224661 | 10/1986 |
| JP | 11-027523 | 1/1989 |
| JP | 06-152951 | 5/1994 |
| JP | 11-122490 | 4/1999 |
| JP | 2001-251482 | 9/2001 |
| JP | 2001-292318 | 10/2001 |
| JP | 2002-232654 | 8/2002 |

* cited by examiner

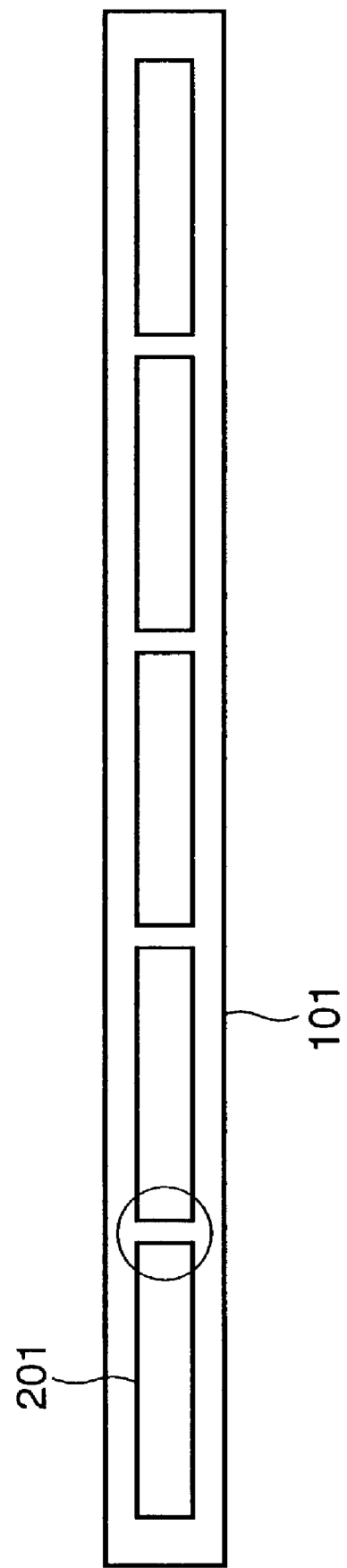

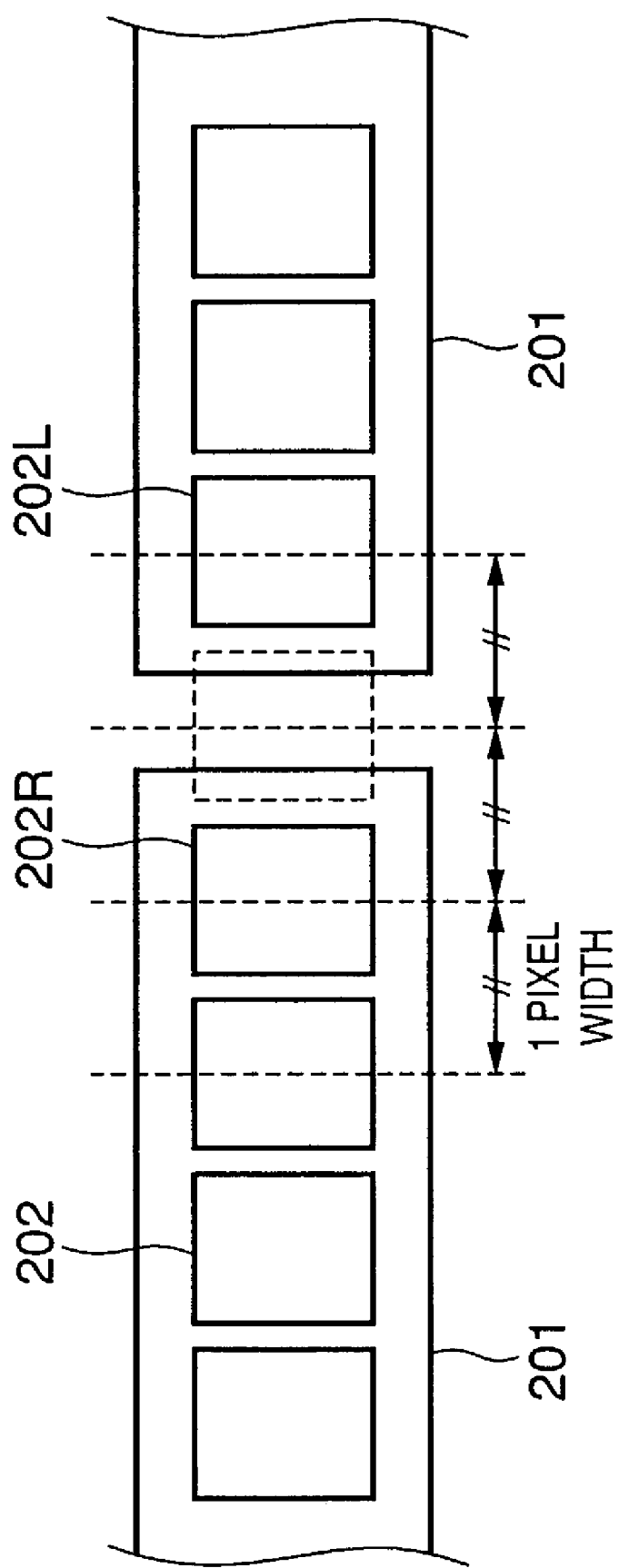

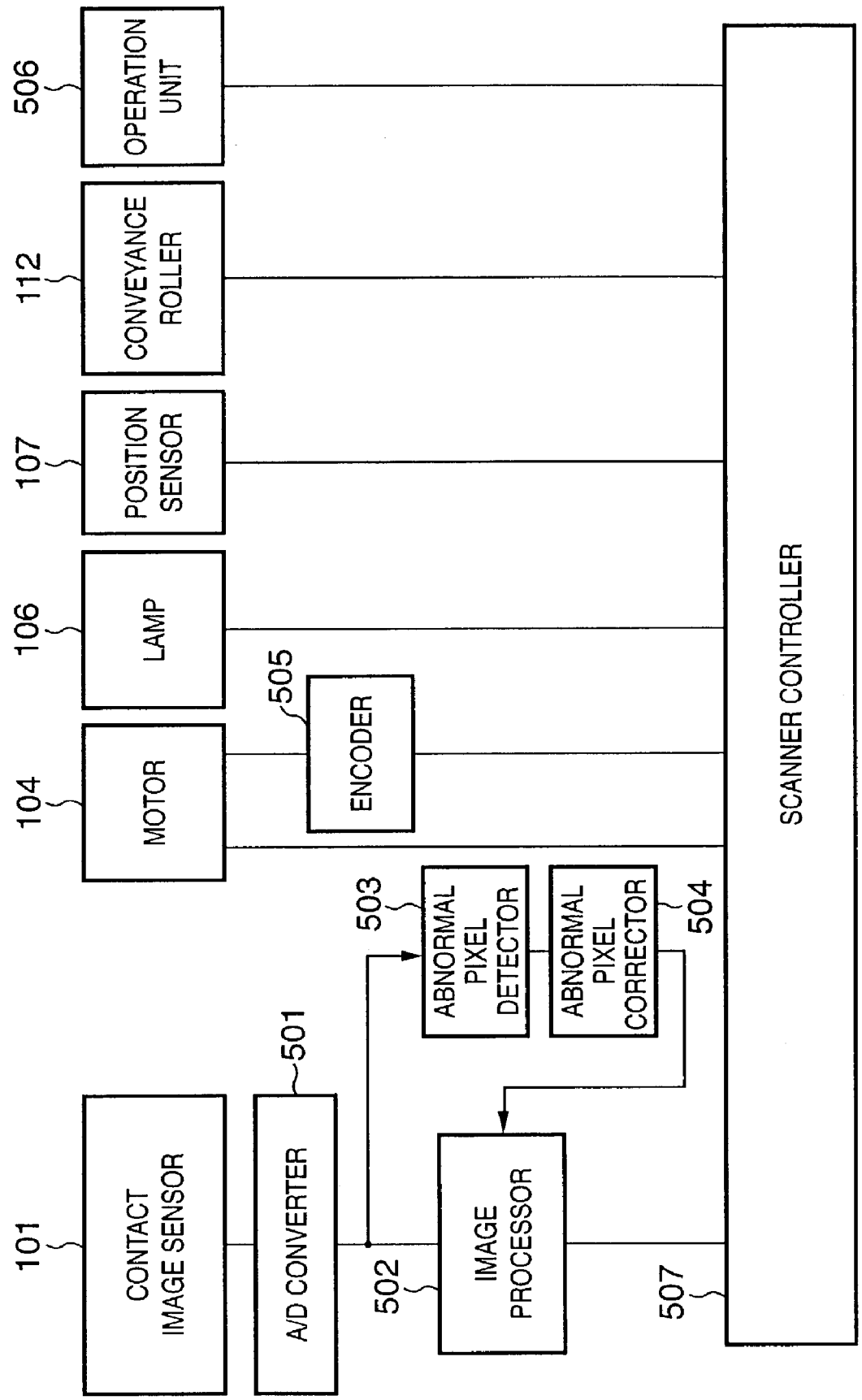

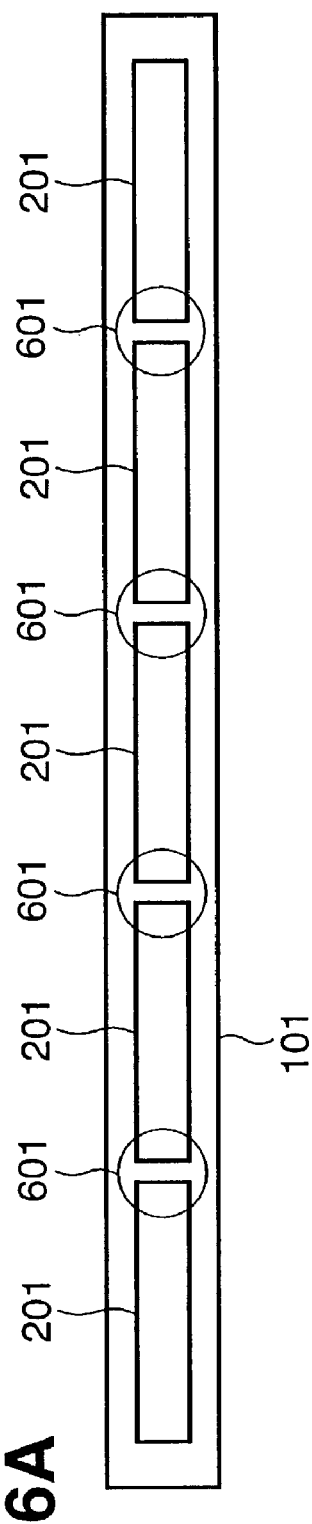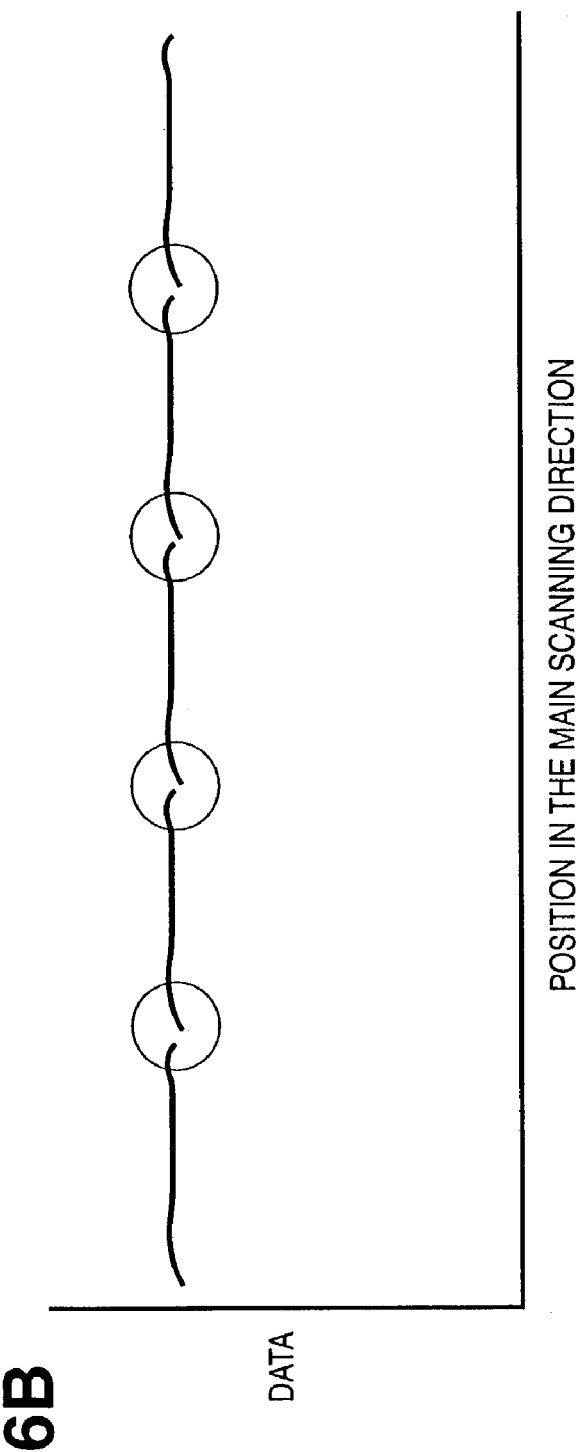

POSITION IN THE MAIN SCANNING DIRECTION

POSITION IN THE MAIN SCANNING DIRECTION

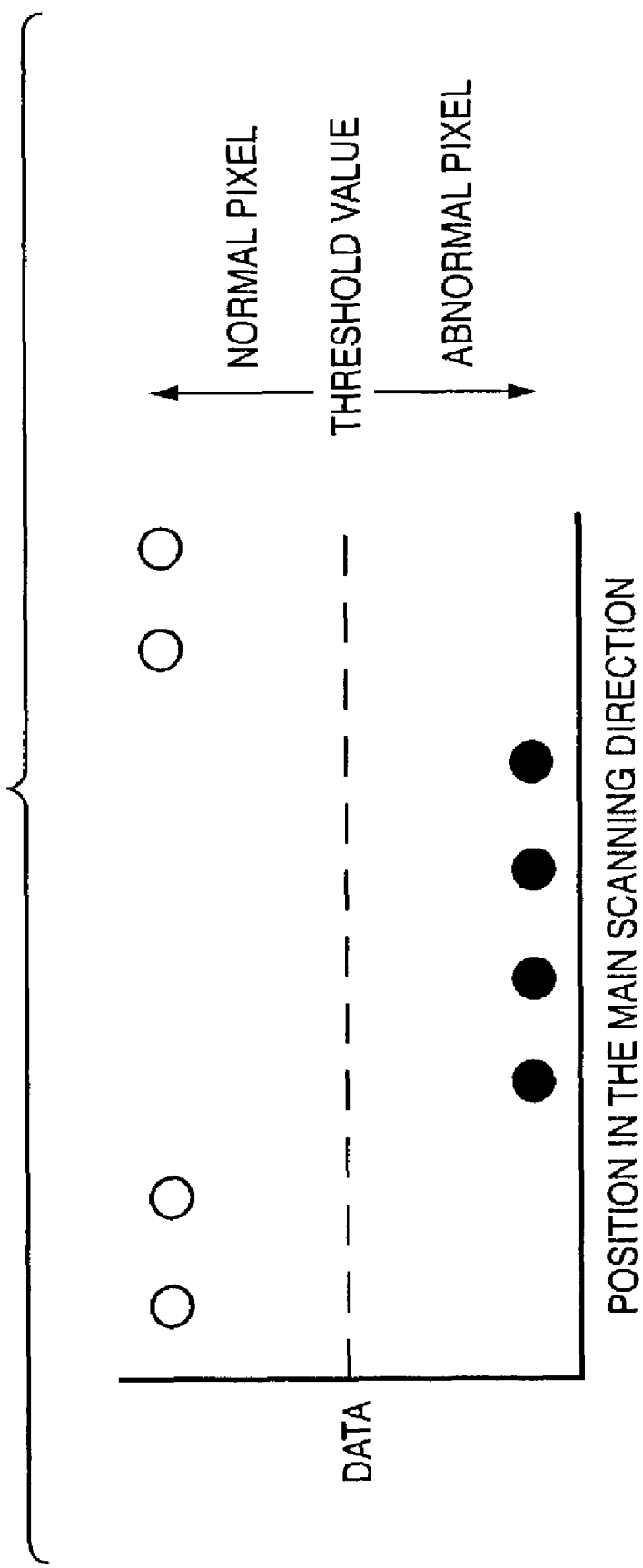

POSITION IN THE MAIN SCANNING DIRECTION

SEAM PORTION

POSITION IN THE MAIN SCANNING DIRECTION

POSITION IN THE MAIN SCANNING DIRECTION

POSITION IN THE MAIN SCANNING DIRECTION

IMAGE PROCESSING METHOD AND APPARATUS

FIELD OF THE INVENTION

The present invention relates to image processing method and apparatus, and more particularly, to image processing method and apparatus for processing on image data obtained from an image sensing unit constituted with arrayed plural sensor chips.

BACKGROUND OF THE INVENTION

Conventionally, in a digital copying machine or the like, an original is read by using a contact image sensor (CIS) having a serially-connected plural sensor chips which read an image for 1 line. The CIS is formed by arraying and connecting the plural sensor chips on a circuit board. However, in a current chip-mounting technology, a pixel pitch in a seam portion between sensor chips is wider than a pixel pitch within each sensor chip. Accordingly, an image sampling period changes in the seam portions, and a stripe appears in an image especially when an original having a periodic pattern, such as a dot pattern, is read.

The problem of stripe always occurs unless the chip-mounting technology is advanced, since the pixel pitch of a sensor chip becomes smaller in accordance with improvement of resolution.

A known method to solve the problem is physically separating the sensor chips for the predetermined number of pixel/pixels upon connection of sensor chips, thereby giving some allowance upon mounting the chips, and interpolating data corresponding to the predetermined number of pixel/pixels with data generated by multiplying outputs from a last pixel of a sensor chip and a head pixel of an adjacent sensor chip by predetermined weighting coefficients.

However, in the above-described interpolation, if any of outputs from pixels near the sensor chip seam portion is abnormal, the interpolation is performed using the abnormal data. As a result, appropriate interpolation cannot be performed and the abnormal data portion is widened.

SUMMARY OF THE INVENTION

The present invention has been made in consideration of the above situation, and has its object to, even if there is abnormal data in image data obtained from an image sensing unit in which plural sensor chips are arrayed with a predetermined interval therebetween, interpolate a seam portion more naturally.

According to the present invention, the foregoing object is attained by providing an image processing method for processing image data, obtained from an image sensing unit in which plural sensor chips each having plural pixels are arrayed with an interval of a multiple of a pixel width therebetween, the method comprising: replacing image data of an abnormal pixel with data in accordance with image data of a pixel adjacent to the abnormal pixel; and interpolating image data for the interval by using image data from a sensor chip adjacent to the interval, wherein if an abnormal pixel exists, image data obtained as a result of replacing the image data of the abnormal pixel is used upon interpolating for the interval.

According to the present invention, the foregoing object is attained by providing an image processing apparatus for processing image data, obtained from an image sensing unit in which plural sensor chips each having plural pixels are arrayed with an interval of a multiple of a pixel width therebetween, the apparatus comprising: a first interpolation unit adapted to replace image data of an abnormal pixel with data in accordance with image data of a pixel adjacent to the abnormal pixel; and a second interpolation unit adapted to interpolate image data for the interval by using image data from a sensor chip adjacent to the interval the gap, wherein if an abnormal pixel exists, the second interpolation unit uses image data obtained as a result of the replacement by the first interpolation unit.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a schematic view of a contact image sensor according to the first embodiment;

FIG. 3 is an enlarged view of a seam portion between CCDs in FIG. 2;

FIG. 5 is a block diagram showing a control construction of the digital scanner according to the first embodiment;

FIG. 6A is a schematic view showing the arrangement of the contact image sensor according to the first embodiment;

FIG. 6B is an explanatory view showing the relation between a signal value obtained from the contact image sensor and a position in the main scanning direction according to the first embodiment;

FIG. 10 is an explanatory view showing detection of abnormal pixel position according to the first embodiment;

DETAILED DESCRIPTION OF THE PREFERRED EMBODIMENTS

Preferred embodiments of the present invention will now be described in detail in accordance with the accompanying drawings.

First Embodiment

Figure 1:
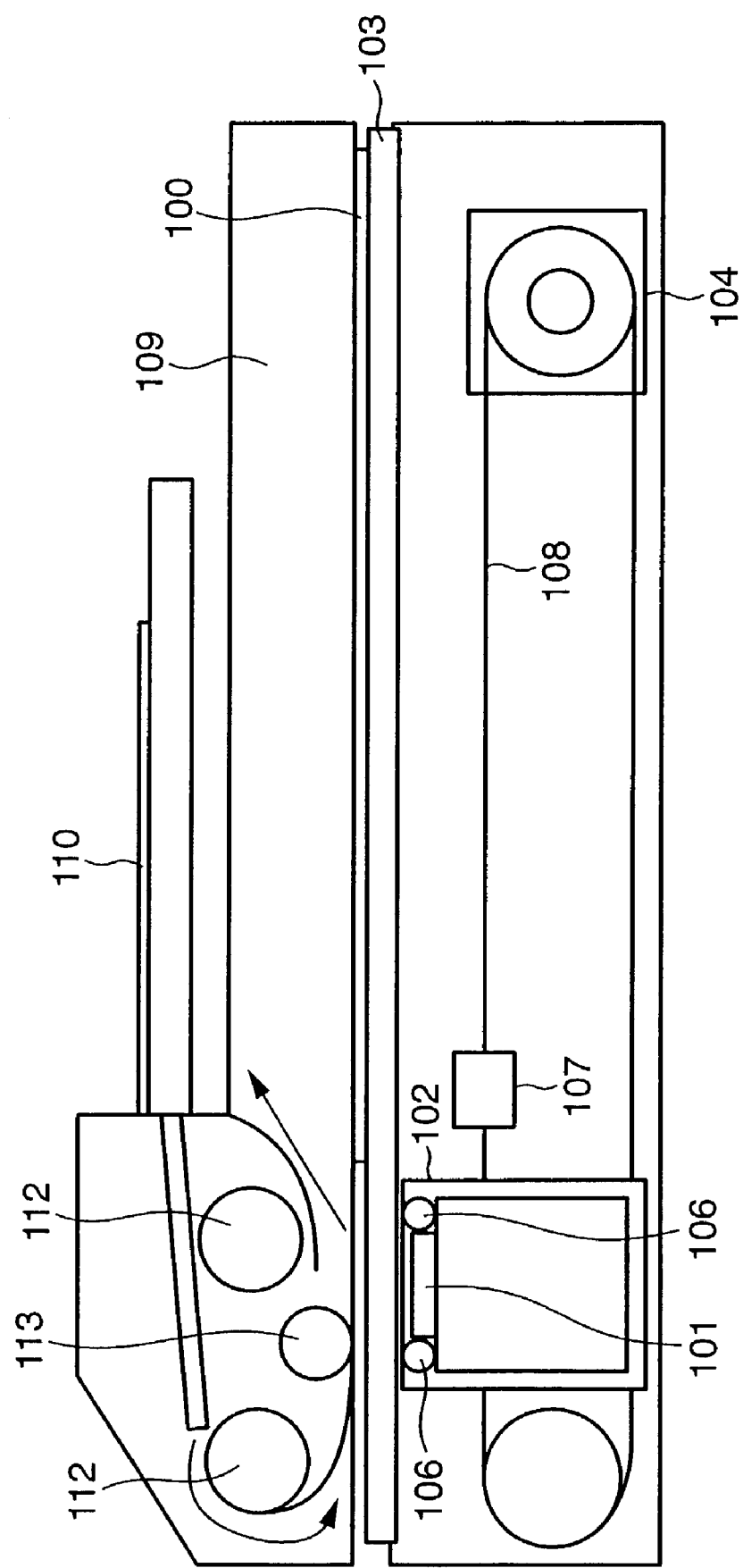
FIG. 1 is a schematic cross-sectional view of a digital scanner according to a first embodiment of the present invention.

FIG. 1 shows the construction of a general digital scanner which reads an original by using a contact image sensor according to a first embodiment of the present invention. A contact image sensor (CIS) unit 102 is provided with a contact image sensor (CIS) 101 and a lamp 106. The CIS unit 102 is connected with a motor 104 by a wire 108. A position sensor 107 indicates a home position of the CIS unit 102. The motor 104 is forward/reverse-rotated based on the home position, thereby the CIS unit 102 can scan the entire reading range of a glass plate 103.

When an original 100 placed on the glass plate 103 is read, the original 100 is read by the CIS 101 while the original 100 is irradiated by the lamp 106 and the CIS unit 102 is moved within the reading range. This reading operation is performed in a plate reading mode.

Further, the digital scanner of the present embodiment is provided with an automatic document feeder (ADF) 109. The CIS unit 102 is moved by the motor 104 and stopped in a position immediately below a platen roller 113, and the original 110, conveyed by a conveyance roller 112, is irradiated by the lamp 106 and read by the CIS unit 102 in the stopped status. This reading operation is performed in an ADF reading mode.

One of the reading modes is selected by an user's instruction.

FIG. 2 is a schematic view of the CIS 101.

The CIS 101, constituted by, e.g., arraying 5 CCDs 201 each having 1500 pixels, reads an A4-sized original in 600 dpi resolution. An image is formed by combining outputs from these 5 CCDs 201 by an image processor to be described later. Note that the number of pixels and the resolution mentioned here are given as an example, and the present invention is not limited to these values.

Figure 4A:
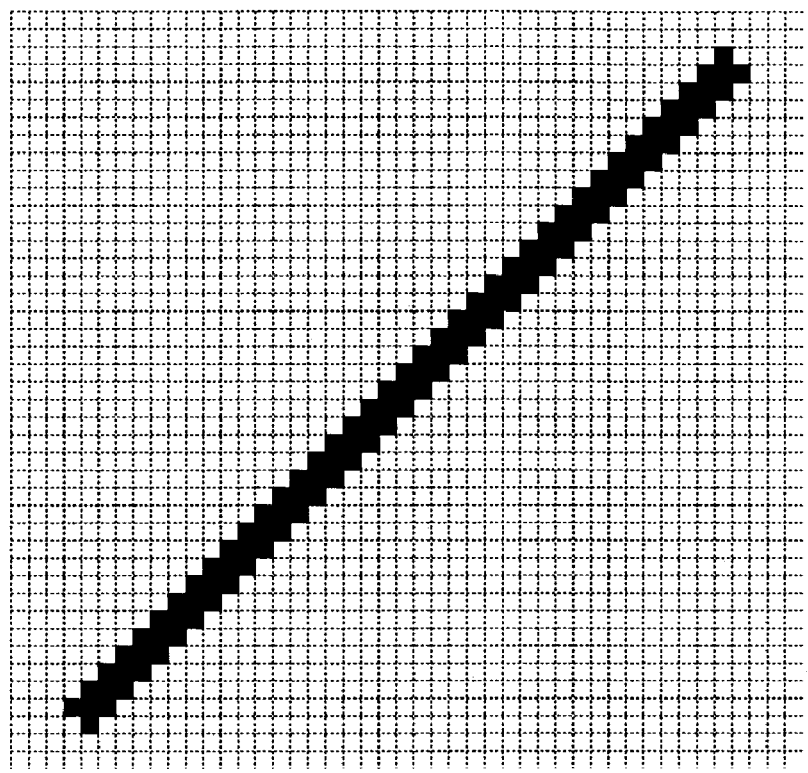
FIGS. 4A and 4B are explanatory views showing a problem in the case of image reading by the contact image sensor in FIG. 2.
Figure 4B:
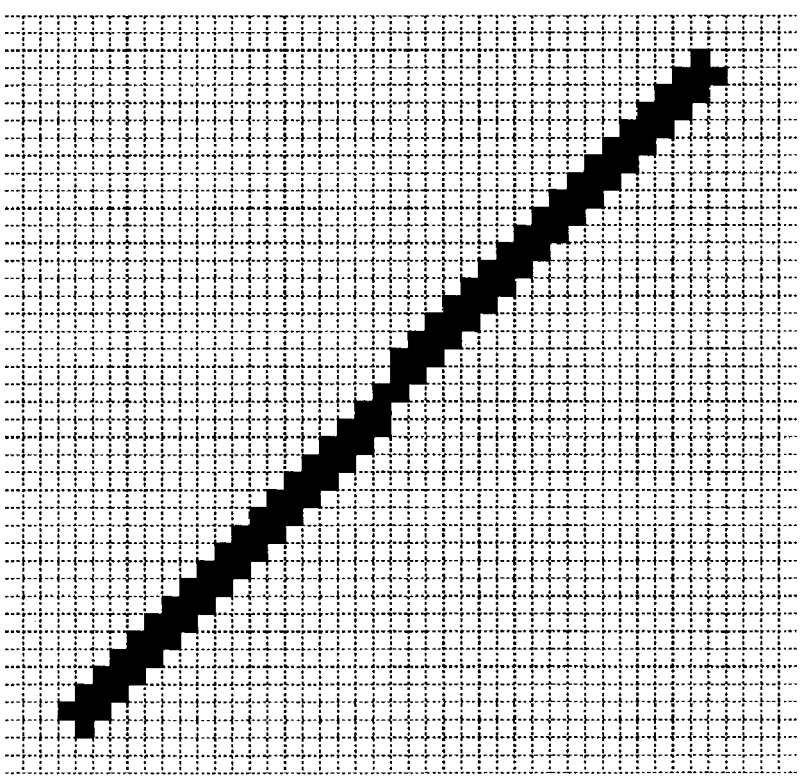

FIG. 3 is an enlarged view of a seam portion between the CCDS 201 in the CIS 101 in FIG. 2. Numeral 202 denotes a pixel. In the first embodiment, the CCDs are connected such that the interval between a rightmost pixel 202R of one CCD 201 and a leftmost pixel 202L of an adjacent CCD 201 is the width of 1 pixel (about 0.0423 mm). In a case where the CIS 101 having the above arrangement reads an image as shown in FIG. 4A (in a size readable by adjacent 2 CCDs 201) and an image is represented based on a signal obtained by the reading, obtained is an unnatural image in which 1 pixel corresponding to the seam portion is lost as shown in FIG. 4B. The unnaturalness can be lessened by interpolating data for the missing pixel by the image processor to be described later.

FIG. 5 is a block diagram showing a control construction of the digital scanner according to the first embodiment. Note that elements corresponding to those in FIG. 1 have the same reference numerals and explanations of the elements will be omitted.

In FIG. 5, numeral 501 denotes an A/D converter which A/D converts an output signal from the CIS 101; 502, an image processor which receives an output from the A/D converter 501 and performs image processing such as shading correction, image processing on a seam portion and the like; 503, an abnormal pixel detector which detects an abnormal pixel in the CIS 101; and 504, an abnormal pixel corrector which corrects data from the abnormal pixel, if detected, by data of normal pixels around the abnormal pixel. The detection by the abnormal pixel detector 503 and the correction by the abnormal pixel corrector 504 are performed prior to the processing by the image processor 502. Further, numeral 506 denotes an operation unit which receives an instruction of mode setting to select the ADF reading mode or the plate reading mode, and an instruction of start of original reading from the user. Numeral 507 denotes a scanner controller which controls the respective constituent elements in the digital scanner. For example, the scanner controller 507 grasps the position of the CIS unit 102 from an output from an encoder 505 provided in the motor 104 and an output signal from the position sensor 107. Further, the scanner controller 507 receives an output signal value from the CIS 101 processed by the image processor 502 and transfers the output signal to an external apparatus (not shown) such as a PC or a printer.

Next, the operation of the digital scanner having the above construction including the image processing on a seam portion in the CIS 101 will be described with reference to the flowcharts of FIGS. 15 and 16.

First, at step S1501, the reading mode designated from the operation unit 506 is determined. At steps S1502 and S1503, the original 100 is read in the respective designated reading mode, and the process proceeds to step S1504.

At step S1504, abnormal pixel detection is performed by the abnormal pixel detector 503, and at step S1505, correction of pixel value of the abnormal pixel is performed by the abnormal pixel corrector 504. These processings will be described in detail later, and here the interpolation processing on a seam portion of image data read at steps S1506 and S1507 will be described.

As described with reference to FIG. 2, in the present embodiment, as it is known that 5 chips of CCDs 201 each having 1500 pixels are used in the CIS 101, a seam portion 601 of the CCDs 201 exists in 4 positions, i.e., as shown in FIG. 6A, every 1500 pixels, for 1 pixel, in the CIS 101. FIG. 6B shows output data corresponding to the positions of the CIS 101 in FIG. 6A in the main scanning direction when an uniform color (e.g., white) original is read by 1 line by the CIS 101. In FIG. 6B, a position surrounded with a circle indicates data corresponding to the seam portion 601.

In this manner, as the adjacent 2 CCDs 201 are arrayed with an interval of 1 pixel, in a case where an image as shown in FIG. 4A is read and a signal based on outputs from the respective pixels of the CCDs 201 is outputted by a PC or printer, the outputted image looks unnatural as shown in FIG. 4B.

Figure 7A:
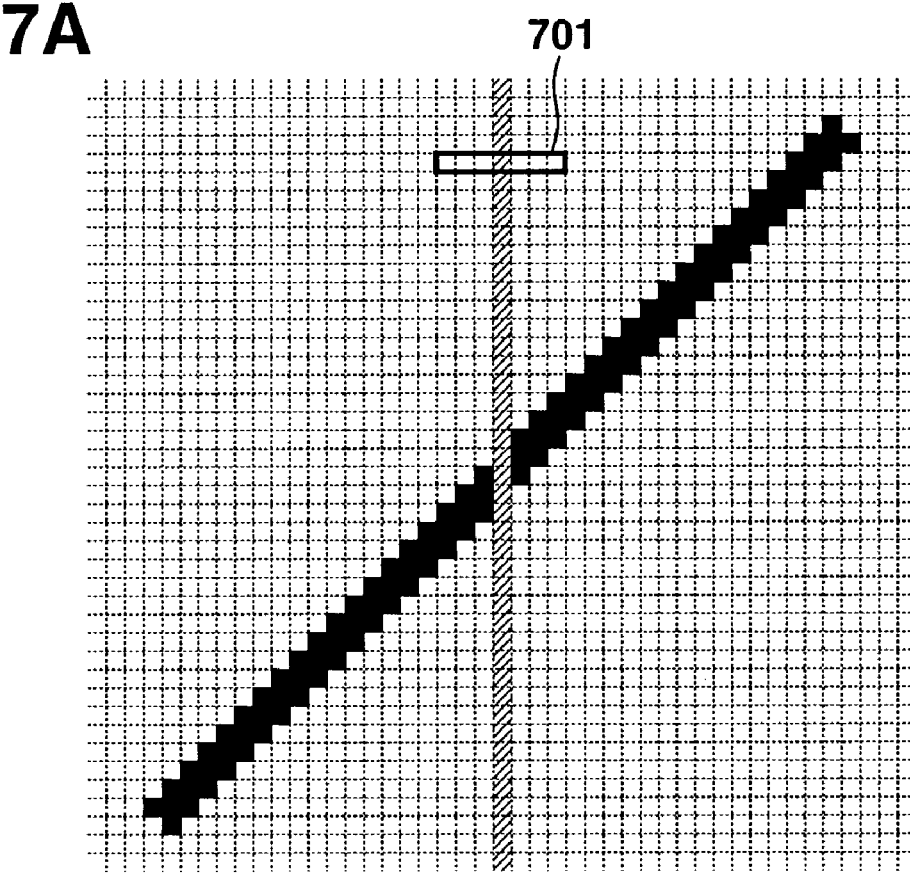
FIGS. 7A and 7B are explanatory views showing the conception of interpolation processing according to the first embodiment.
Figure 7B:
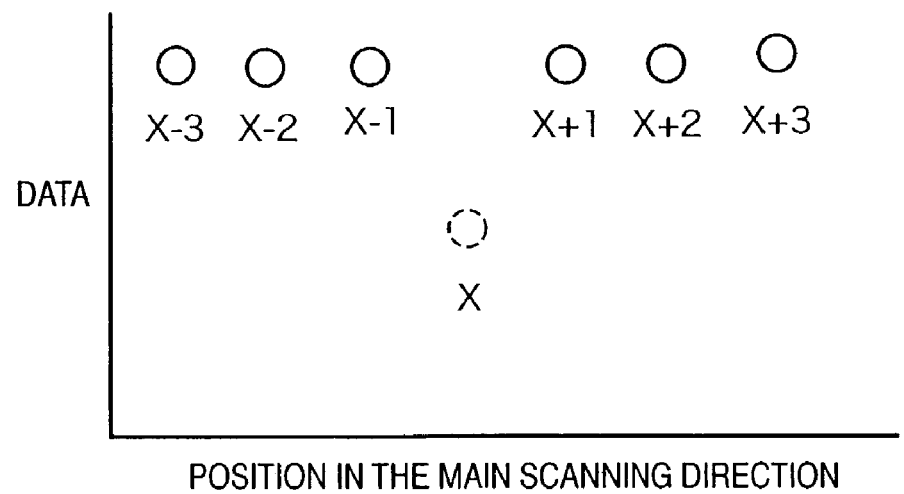

In the present embodiment, to make this unnatural image more natural, the image processor 502 first inserts dummy data D (seam portion data) having an arbitrary value into the seam portion (step S1506). FIG. 7A shows an image where the dummy data D is inserted in the image in FIG. 4B. FIG. 7B shows output data of a portion 701 in FIG. 7A surrounded by a bold frame. After the insertion of the dummy data D, the image processor 502 performs weighting calculation as shown in the following equation (1) by using peripheral pixels of the seam portion, $X-2$, $X-1$, $X+1$ and $X+2$, and replaces the dummy data D with the result of calculation (step S1507).

Figure 8A:
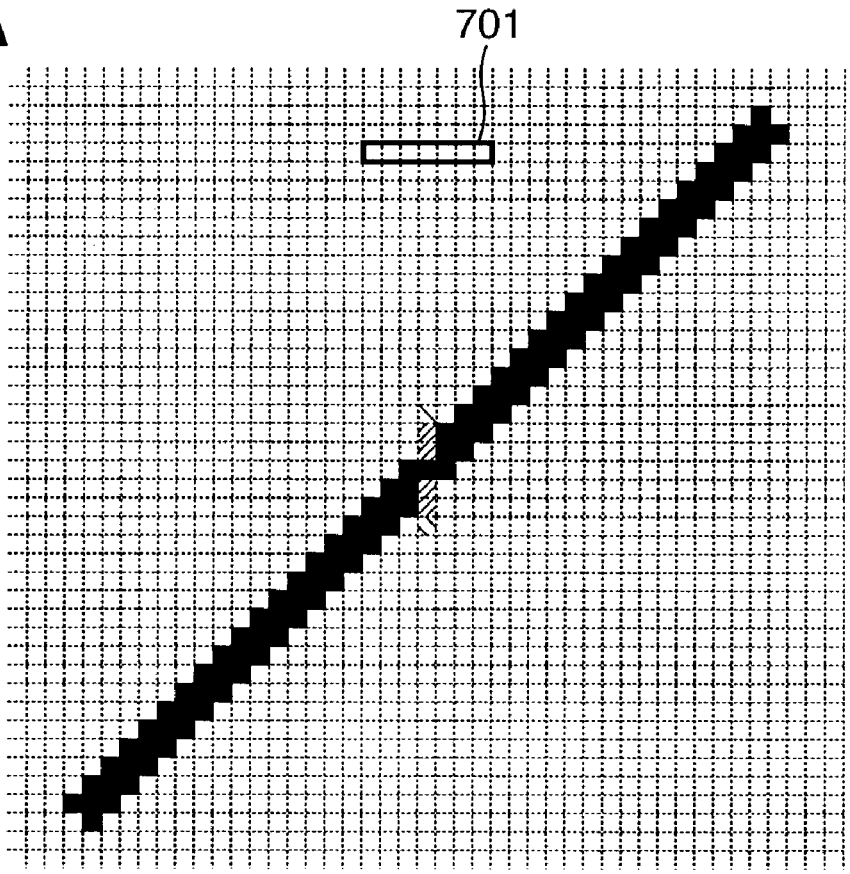
FIGS. 8A and 8B are explanatory views showing the conception of the interpolation processing according to the first embodiment.
Figure 8B:
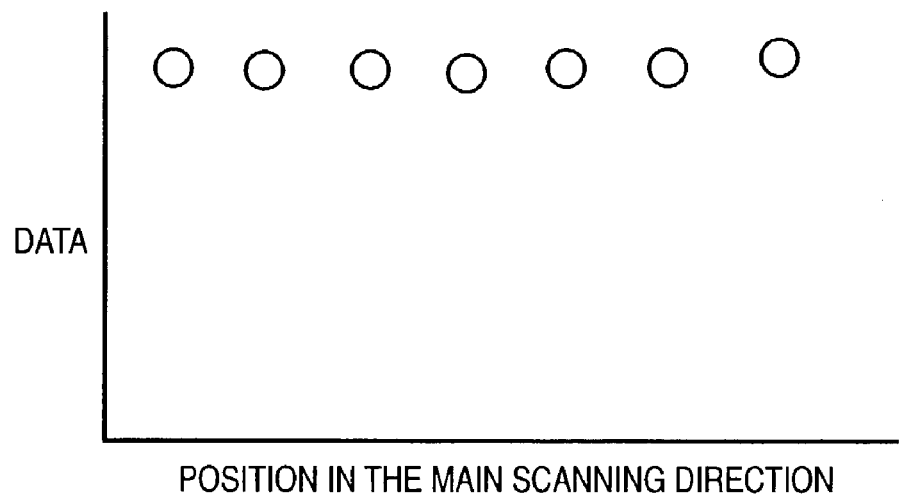

FIGS. 8A and 8B show an example after the dummy data D is replaced. Note that in the equation (1), (X−2), (X−1), (X+1) and (X+2) indicate values of corresponding pixels.

$$X = a(X-2) + b(X-1) + c(X+1) + d(X+2) \quad (1)$$

where a+b+c+d=1

In this manner, the seam portion data is replaced with the result of weighting of data of peripheral pixels, thereby a more natural image can be generated.

Note that in the present embodiment, the weighted result of 2 pixel data in each of the two directions is used as replacement data, however, a similar advantage can be expected in the case of replacement with a simple average value of pixels X−1 and X+1 or in the case of weighting by using pixel values of 3 or more pixels in the respective directions.

Next, the operation of the abnormal pixel detector 503 at step S1504 and the operation (referred to as "abnormal pixel correction") of the abnormal pixel corrector 504 at steps S1504 and S1505, respectively, will be described.

Figure 9A:
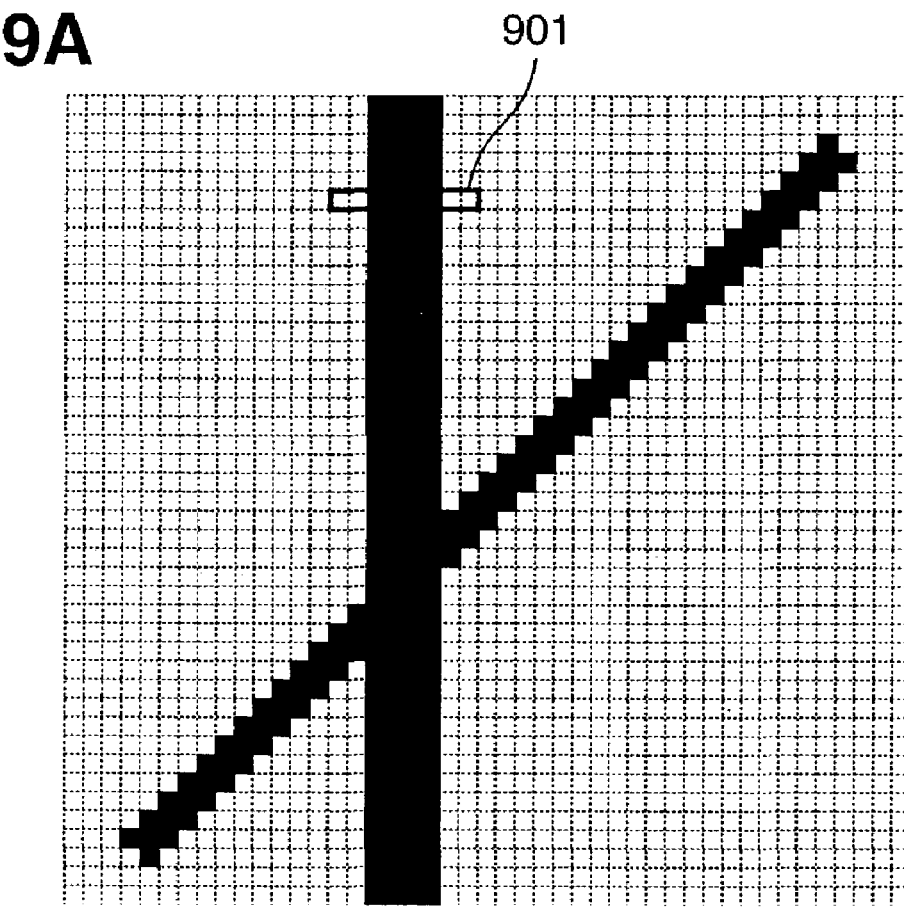
FIGS. 9A and 9B are explanatory views showing the conception of the interpolation processing according to the first embodiment.
Figure 9B:
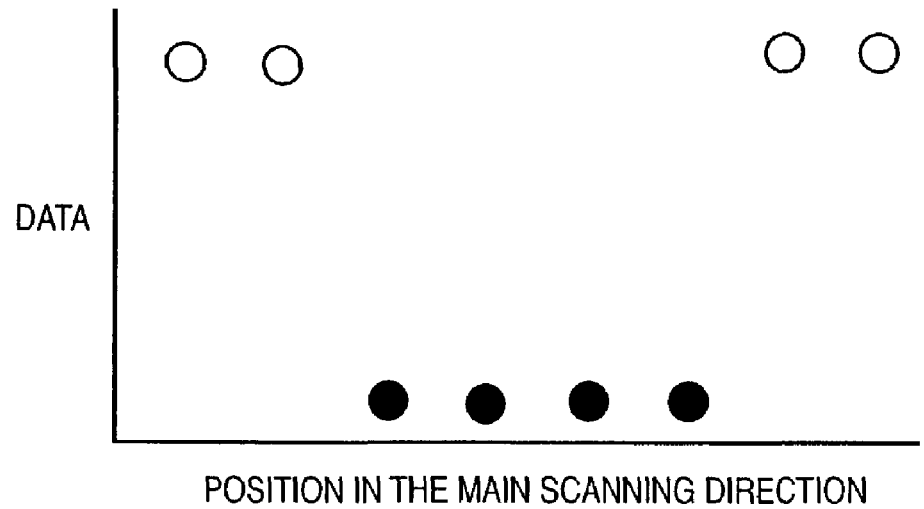

In the ADF reading mode, an image is read by conveying the original 110 in a state where the CIS 101 is stopped. If a foreign material, dust, blot or the like are attached to a reading position on the glass plate 103, the CIS 101 reads it, and a stripe appears in a read image. FIG. 9A shows an example of image obtained by reading the image shown in FIG. 4A when a foreign material or the like is present on the glass plate 103. FIG. 9B shows output data of an image part 901 surrounded by a bold frame.

As shown in FIG. 10, the position of foreign material or the like can be detected by performing image reading by the CIS 101 with the platen roller 113 colored white and binarizing the read data with a predetermined threshold value. In this manner, at step S1504, the abnormal pixel detector 503 detects the position of abnormal pixel/pixels influenced by the foreign material or the like.

Figure 11A:
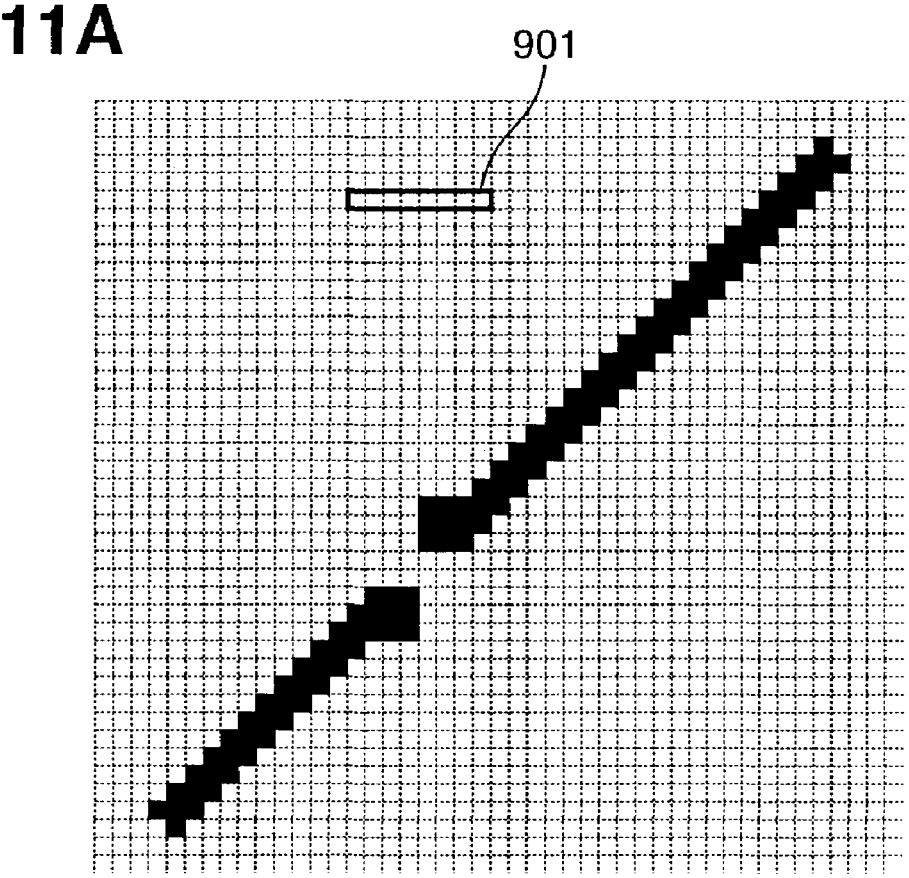
FIGS. 11A and 11B are explanatory views showing the conception of the interpolation processing according to the first embodiment.
Figure 11B:
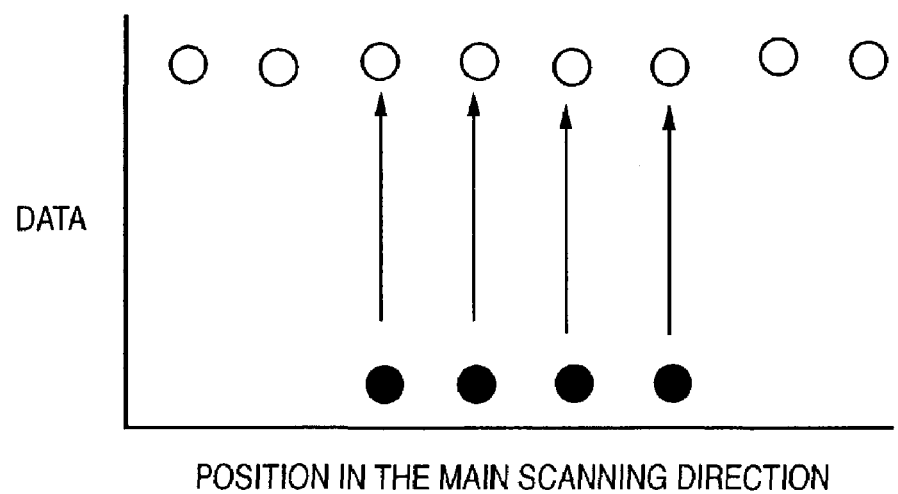

At step S1505, to correct data of the abnormal pixel/pixels, the abnormal pixel corrector 504 receives foreign-material position information based on the result of binarization by the abnormal pixel detector 503. If 4 continuous pixels correspond to the foreign material or the like, data of the 4 pixels are replaced with data using pixels on the both sides of the 4 pixels such that data of left 2 pixels are replaced with data using the left side pixels, and data of right 2 pixels, with data using the right side pixels of the 4 pixels. FIGS. 11A and 11B show the result of replacement.

In this manner, the data of pixels detected as abnormal pixels corresponding to the foreign material portion is replaced by using data of pixels on both sides of the abnormal pixels, thereby a more natural image can be generated.

Note that if the abnormal pixel detector 503 detects 10 or more continuous abnormal pixels corresponding to a foreign material or the like (YES at step S1601), in image formation of fine characters or lines, unnaturalness may remain even through the correction processing. In such case, the correction processing is not performed (step S1603) and the data is outputted to the PC or the like to notify the user of the occurrence of abnormality.

Figure 12A:
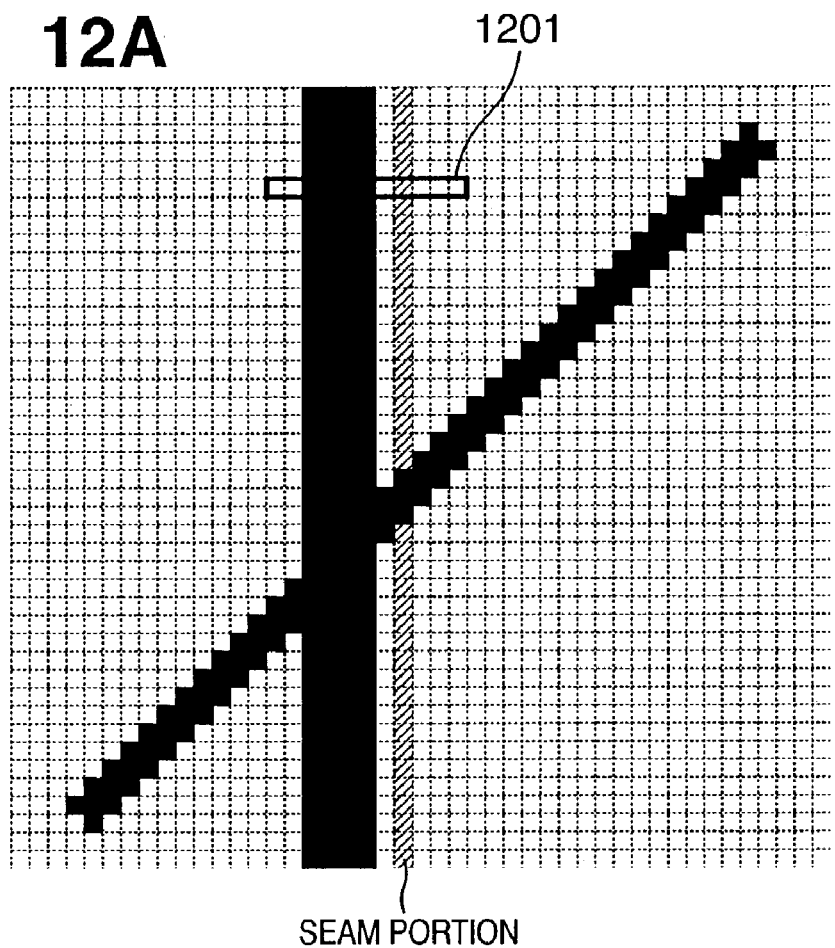
FIGS. 12A and 12B are explanatory views showing the conception of the interpolation processing according to the first embodiment.
Figure 12B:
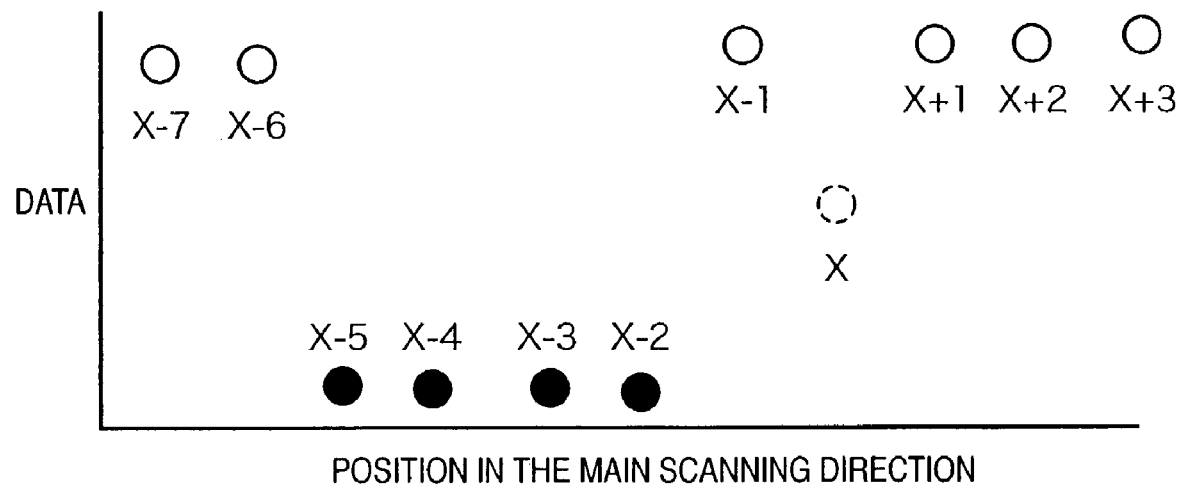
Figure 13A:
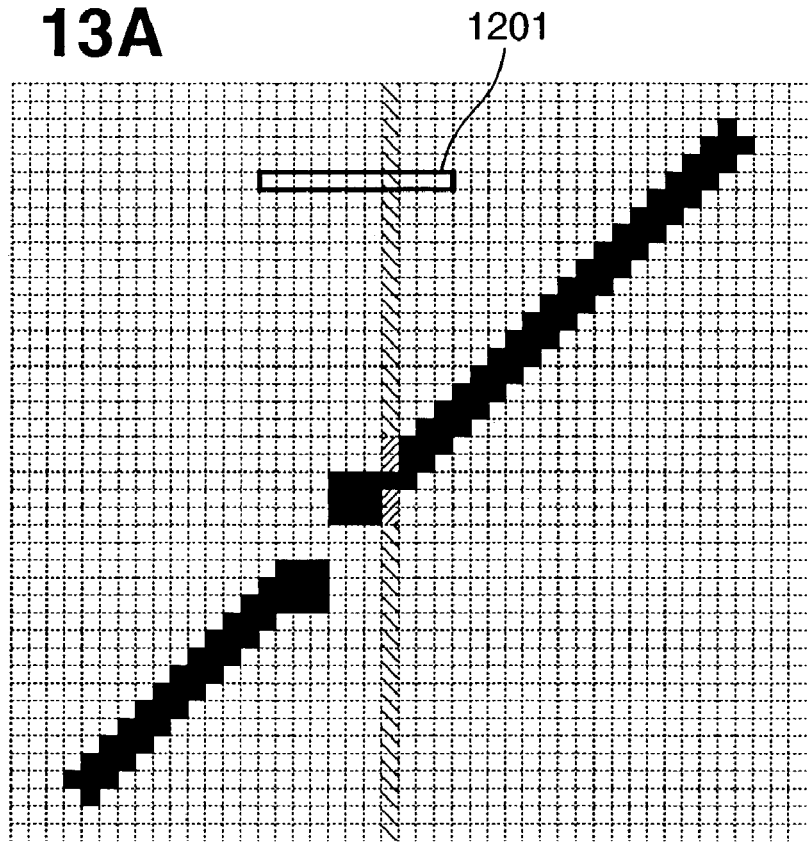
FIGS. 13A and 13B are explanatory views showing the conception of the interpolation processing according to the first embodiment.
Figure 13B:
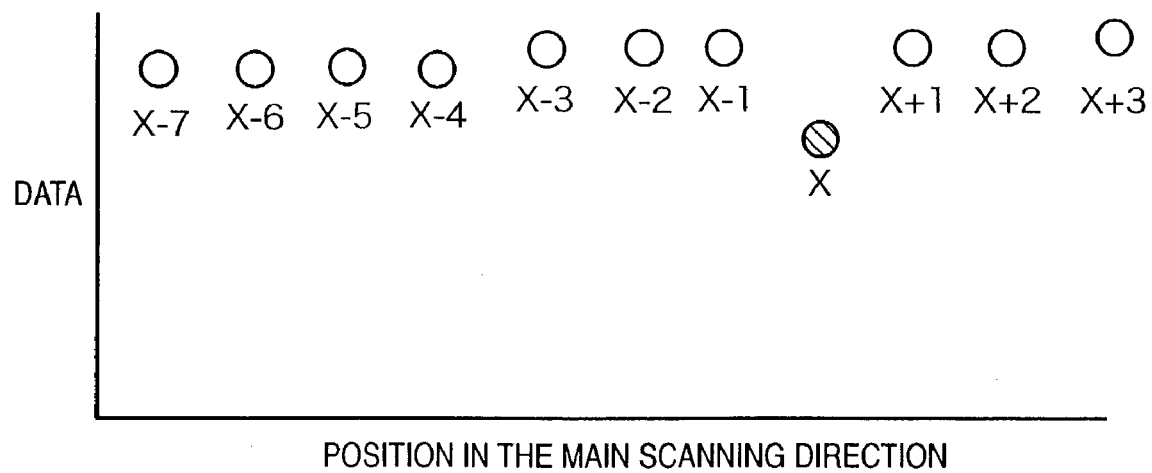

Considering that replacement of the seam portion data is performed prior to the abnormal pixel correction, in a case where a foreign material as shown in FIG. 12B exists in a position as shown in FIG. 12A, data to be interpolated at the seam portion X=75 holds assuming that weighting parameters A=B=C=D=0.25 holds, a maximum reading value is 100, the threshold value for abnormal pixel detection is 50, and (X−3)=0, (X−2)=0, (X−1)=100, (X+1)=0 and (X+2)=100 hold. In this case, the influence of the foreign material appears in the data X to be interpolated at the seam portion, however, as the threshold value in the abnormal pixel detector is 50, the foreign material cannot be detected and a stripe appears in an output image. FIG. 13A shows an image obtained by reading and outputting the image in FIG. 4A, and FIG. 13B shows data of a portion 1201 surrounded by a bold frame in FIG. 13A corresponding to the position in the main scanning direction.

Figure 14A:
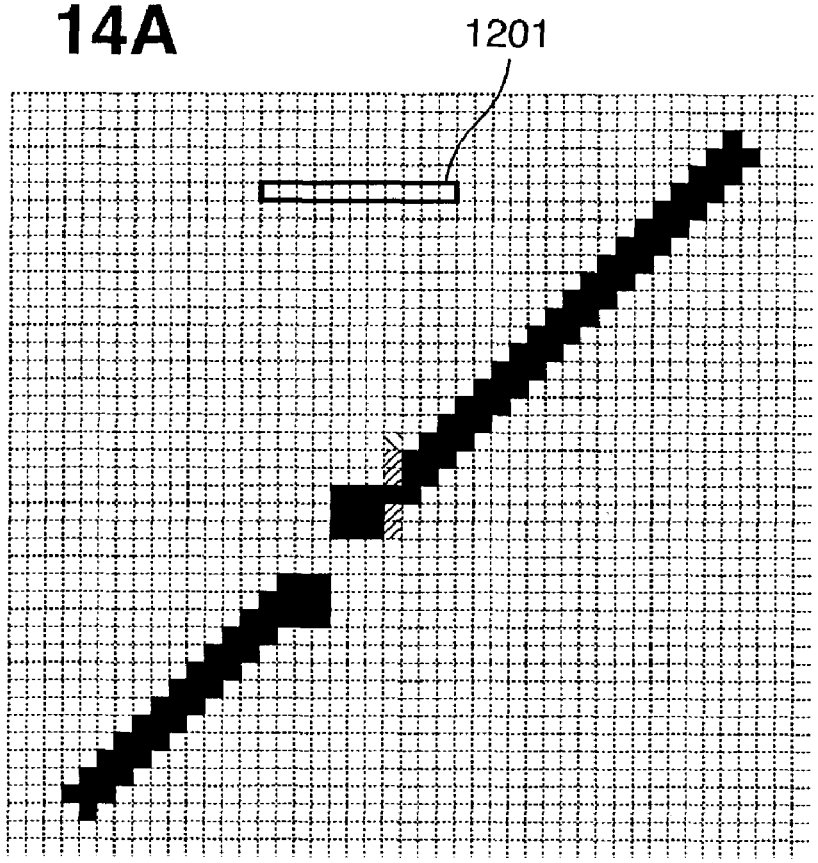
FIGS. 14A and 14B are explanatory views showing the conception of the interpolation processing according to the first embodiment.
Figure 14B:
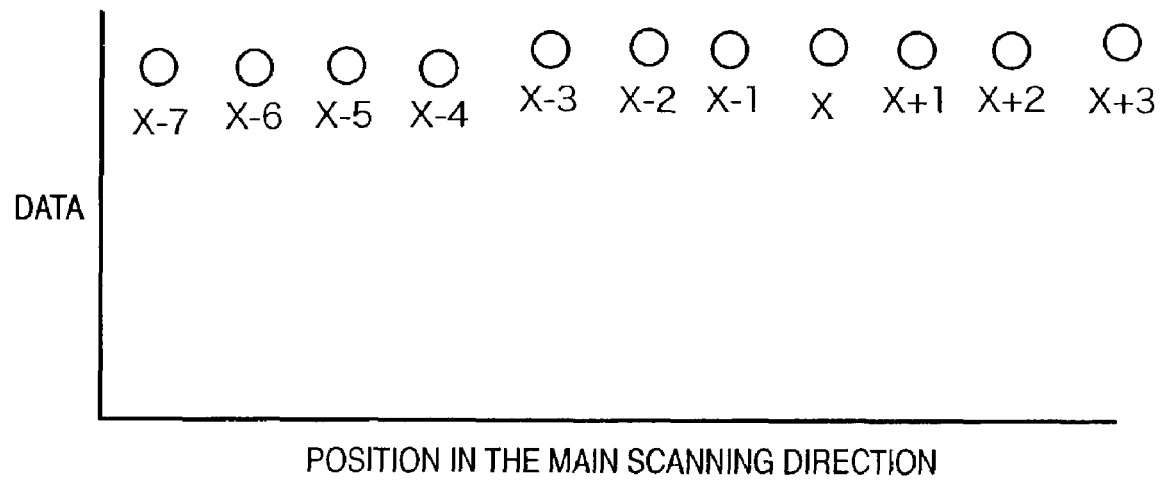

For this reason, the abnormal pixel correction (step S1505) must be performed prior to the replacement of the seam portion data (step S1506 and S1507). FIGS. 14A and 14B show the result of processing in this order.

In this manner, in the digital scanner according to the first embodiment, as the abnormal pixel correction is performed prior to the replacement of the seam portion data, even if abnormal pixels influenced by a foreign material or the like exist, the seam portion can be interpolated such that a more natural image can be generated.

Second Embodiment

Next, a second embodiment of the present invention will be described. As the construction of the digital scanner of the second embodiment is the same as that of the first embodiment, explanation thereof will be omitted. In the second embodiment, the operation of the digital scanner will be described about a case where the replacement of seam portion data and abnormal pixel correction are performed on shading-corrected data.

Figure 17:
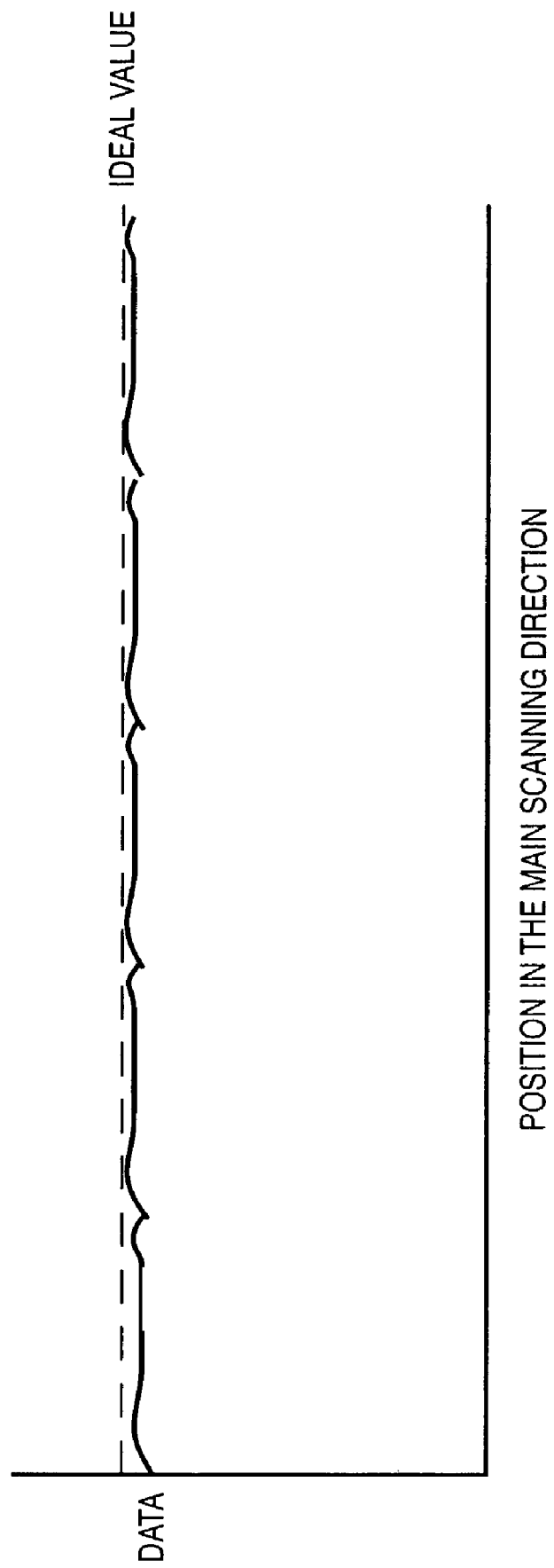
FIG. 17 is an explanatory view showing shading correction according to a second embodiment of the present invention.

FIG. 17 shows data output obtained from the CIS 101 by reading a uniform white original irradiated by the lamp 106, which is a reference output in respective positions in the main scanning direction. Generally, values are nonuniform by pixel due to variation of lamp itself, variation of sensitivity of pixels in the CCD 201 or the like.

Accordingly, shading correction represented by the following equations (2) is applied to respective pixels, thereby outputs are uniformly corrected.

$$Dout = T/Dinw \times Din \quad (2)$$

where T=target value upon reading of uniform white reference original

Dinw=pixel output upon reading of uniform white reference original

Din=read data

Dout=pixel data after shading correction

As described above, prior to reading an original, a uniform white reference original is read then a pixel output is stored, and the above-described correction processing is performed, thereby outputs are uniformly corrected.

Interpolation data for seam portion generated in the process of replacing seam portion data is, e.g., pseudo data obtained by weighting data of peripheral pixels by the above-described equation (1). To perform accurate shading correction, the weighting of data of the peripheral pixels must be applied to the values obtained by reading the uniform white reference original. However, in this case, the image processing construction becomes complicated. Therefore, the shading correction must be performed prior to the replacement of seam portion data and abnormal pixel correction.

In the above-described first and second embodiments, in the CIS, an abnormal pixel position is detected and abnormal pixel correction is performed, then the replacement of seam portion data is performed. It goes without saying that a similar advantage can be obtained in a case where plural area sensors are serially connected.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program code read from the storage medium realizes the functions according to the embodiments, and the storage medium holding the program code constitutes the invention.

Further, the storage medium, such as a floppy disk, a hard disk, an optical disk, a magneto-optical disk, a CD-ROM, a CD-R, a DVD, a magnetic tape, a non-volatile type memory card, a ROM, and a computer network such as a LAN (local area network) and a WAN (wide area network), can be used for providing the program code.

Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read form the storage medium is written in a function expansion card which is inserted into the computer or in a memory provided in a function expansion unit which is connected to the computer, a CPU or the like contained in the function expansion card or unit performs a part or entire processes in accordance with designations of the program code and realizes the functions of the above embodiments.

Figure 15:
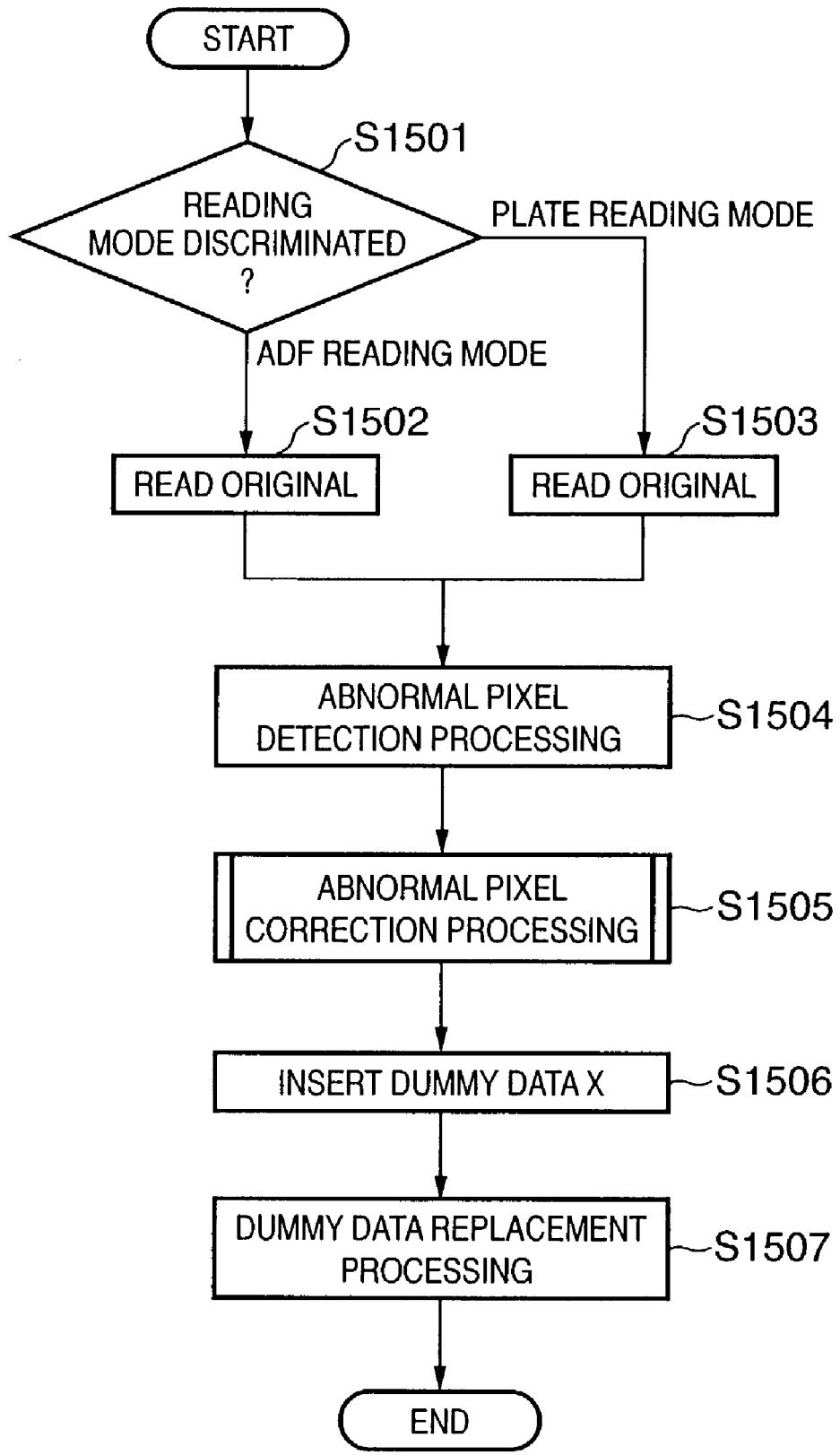
FIG. 15 is a flowchart showing a procedure of the image reading and the interpolation processing on pixel data according to the first embodiment.
Figure 16:
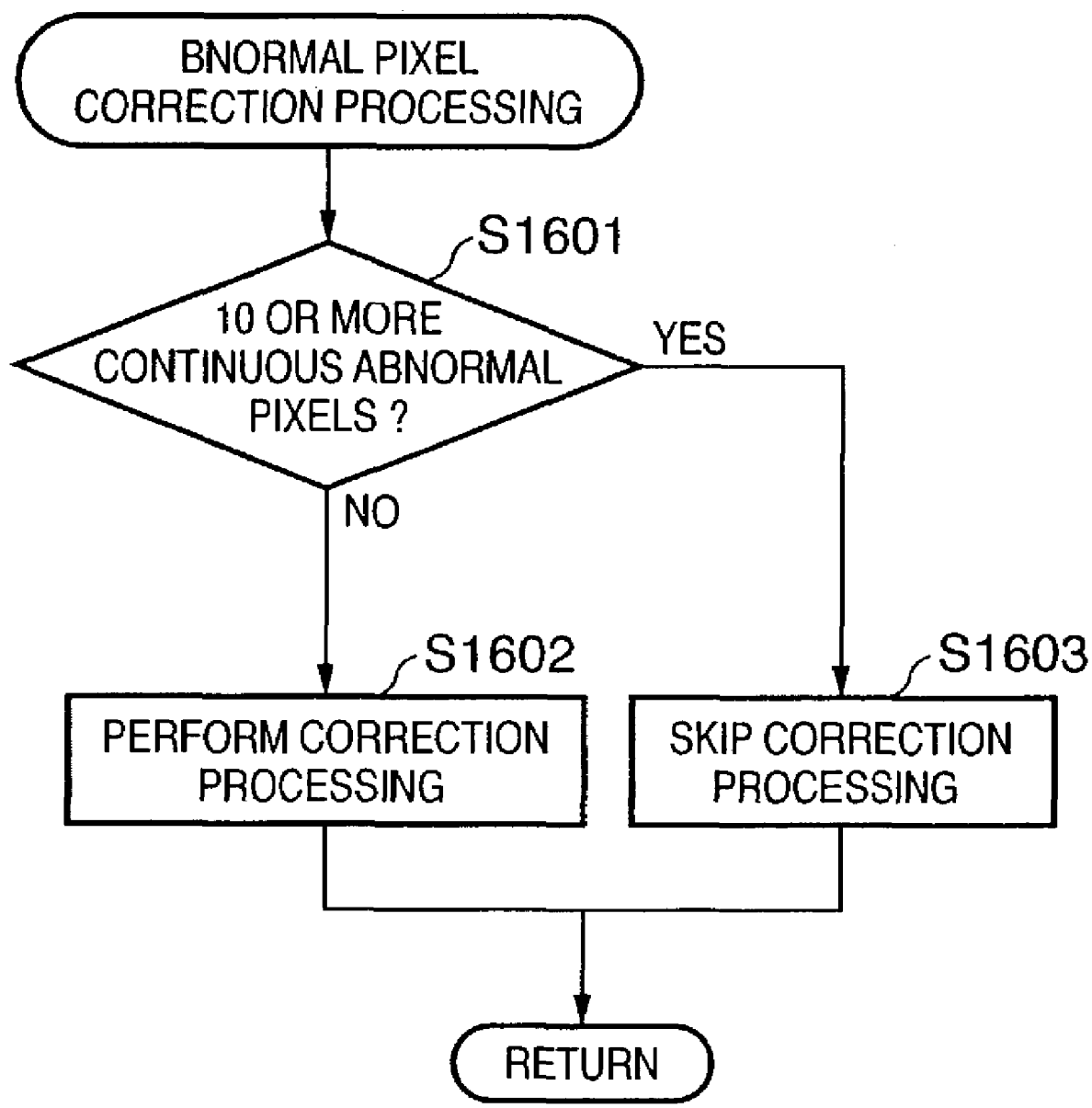
FIG. 16 is a flowchart showing a procedure of abnormal pixel correction processing according to the first embodiment.

In a case where the present invention is applied to the aforesaid storage medium, the storage medium stores program codes corresponding to the flowcharts shown in FIGS. 15 and 16 described in the embodiments.

The present invention is not limited to the above embodiments and various changes and modifications can be made within the spirit and scope of the present invention. Therefore, to appraise the public of the scope of the present invention, the following claims are made.

What is claimed is:

1. An image processing method for processing image data, obtained from an image sensing unit in which plural sensor chips each having plural pixels are arrayed with a chip interval therebetween, said method comprising:
   an image reading step of scanning image data;
   a specific pixel detection step of detecting a specific pixel, which is specified by a threshold value, in image data of a white reference scanned in the image reading step, in case there exists the specific pixel;
   a specific pixel correction step of correcting image data of an original scanned in the image reading step by replacing image data of the specific pixel detected in said specific pixel detection step with data in accordance with image data of a pixel adjacent to the specific pixel; and
   an interval correction step of interpolating image data of the original for said chip interval by using image data which is corrected in said specific pixel correction step and is adjacent to said chip interval.

2. The image processing method according to claim 1, further comprising:
   prior to said detection, performing shading correction processing on the image data obtained from said plural sensor chips.

3. The image processing method according to claim 2, wherein, if a predetermined number or more of continuous specific pixels are detected, said replacement of image data of a specific pixel is skipped.

4. The image processing method according to claim 1, wherein image data of a predetermined number of pixel or pixels is used upon interpolating for said chip interval.

5. The image processing method according to claim 1, wherein an average value of said image data is used upon interpolating for said chip interval.

6. The image processing method according to claim 1, wherein a weighted average value of said image data is used upon interpolating for said chip interval.

7. An image processing apparatus for processing image data, obtained from an image sensing unit in which plural sensor chips each having plural pixels are arrayed with a chip interval of a multiple of a pixel width therebetween, said apparatus comprising:
   an image reading unit adapted to scan image data,
   a specific pixel detection unit adapted to detect a specific pixel, which is specified by a threshold value, in image data of a white reference scanned by the image reading unit, in case there exists the specific pixel;
   a first interpolation unit adapted to correct image data of an original scanned by the image reading unit by replacing image data of the specific pixel detected by said specific pixel detection unit with data in accordance with image data of a pixel adjacent to the specific pixel; and
   a second interpolation unit adapted to interpolate image data of the original for said chip interval by using image data which is corrected by said specific pixel detection unit and is adjacent to said chip interval.

8. The image processing apparatus according to claim 7, further comprising:
   a shading correction unit adapted to, prior to said detection by said specific pixel detection unit, perform shading correction processing on the image data obtained from said plural sensor chips.

9. The image processing apparatus according to claim 7, wherein, if said specific pixel detection unit detects a predetermined number or more of continuous specific pixels, said first interpolation unit is inactivated.

10. The image processing apparatus according to claim 7, wherein said second interpolation unit uses image data of a predetermined number of pixel or pixels.

11. The image processing apparatus according to claim 7, wherein said second interpolation unit uses an average value of said image data.

12. The image processing apparatus according to claim 7, wherein said second interpolation unit uses a weighted average value of said image data.

13. An image reading apparatus including the image processing apparatus according to claim 7, a glass plate on which an original is placed, and a lamp which irradiates said original.

14. An image reading apparatus including the image processing apparatus according to claim 7, conveyance rollers which convey an original, and a lamp which irradiates said original.

15. A computer-readable storage medium holding a computer program code executable by an information processing apparatus, having program code to realize the image processing method according to claim 1.

16. A computer-readable storage medium holding a computer program code executable by an information processing apparatus, for causing the information processing apparatus which executes said program to function as the image processing apparatus according to claim 7.

\* \* \* \* \*